April 15, 1958　　　M. H. BRUCER　　　2,831,122
RADIATION SOURCES

Filed Nov. 9, 1955　　　　　　　　　　　2 Sheets-Sheet 1

INVENTOR.
BY　Marshall H. Brucer
ATTORNEY

April 15, 1958 M. H. BRUCER 2,831,122
RADIATION SOURCES

Filed Nov. 9, 1955 2 Sheets-Sheet 2

INVENTOR.
BY Marshall H. Brucer
ATTORNEY

United States Patent Office 2,831,122
Patented Apr. 15, 1958

2,831,122

RADIATION SOURCES

Marshall H. Brucer, Oak Ridge, Tenn., assignor to the United States of America as represented by the United States Atomic Energy Commission Application November 9, 1955, Serial No. 546,017

5 Claims. (Cl. 250—86)

The present invention relates to sources of gamma radiation, and more especially to a novel, long-lived source of gamma radiation especially suitable for calibration purposes, now denoted mock-iodine 270.

Radioactive iodine-131 is widely used to measure thyroid metabolism. Many different methods have been proposed for measuring the iodine uptake, and various corrections to observed measurements are made in different laboratories for absorption and back-scatter of the emitted gamma radiation in human tissue. It has been suggested that were a test available for measuring or calibrating the methods used in various laboratories, inferior methods might be eliminated and standardization achieved. One such calibration method involves making measurements on a calibrated standard sample in a full sized phantom closely duplicating the upper half of the human torso. These phantoms are very expensive to construct and cannot be properly used with iodine-131 because of the short 8-day half life of the iodine, requiring frequent openings of the phantom for refilling with iodine. Besides destroying the phantom by frequent opening and sealing, the calibration of each of the repeated fillings would be open to serious question.

With a knowledge of the problems encountered by those seeking to standardize or evaluate iodine uptake measurements and calibrate certain gamma detectors, I have for an object of my invention provision of a novel gamma radiation source so comprised that it emits gamma quanta of such energy and in such numbers that it simulates the gamma ray spectrum of iodine 131, but has a much longer half life, so that measurements and calibrations with a standard source may be continued accurately over a period of years, rather than days. A further object of my invention is to provide a radiation source characterized by a long half-life from selected ratios of barium and cesium, filtered through an absorber, such that it emits gamma rays very closely approximating those emitted by iodine-131. Another object of the invention is to provide a fluid standard gamma ray source characterized by a gamma ray spectrum simulating that of iodine-131 and comprising barium and cesium dispersed in an ion exchange resin and filtered by a metal. These and other objects of my invention will be better understood from the following description of a preferred embodiment thereof, when read in connection with the appended drawings, wherein:

According to my invention, I have provided a novel gamma source comprising barium-133 and cesium-137 present in ratios of about 5.7/1 to 14/1 and filtered through an absorber of selected characteristics. This source produces a gamma spectrum simulating that of iodine-131, having substantially the same configuration and enclosing substantially equal areas under the spectral curves, yet it has a relatively long useable life of about 10 years. My generic invention may be embodied in so-called "point" sources, wherein the mixture is encased in an absorber, and also in fluid sources, wherein the barium and cesium mixture is dispersed uniformly in whatever strength desired in an ion exchange resin, such as "Dowex 50," to provide a simulation of radioactive human tissue. "Dowex 50" resin, a product of Dow-Corning, has a soft tissue-like effective Z, its density is close to unity, it is non-corrosive, and it binds tightly the long-lived isotopes. It consists principally of benzene rings linked in cross-linked carbon to carbon chains, with hydroxyl and sulfonic acid groups attached.

Figure 1:
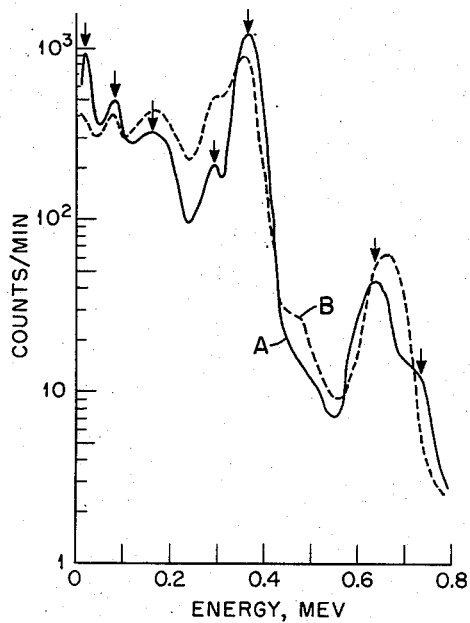
Figure 1 illustrates the gamma ray spectra in air of iodine-131 in curve A and mock-iodine-270 in curve B.

Referring now to Figure 1, curve A, the iodine-131 spectrum in air is plotted from data taken with a scintillation counter and an associated multi-channel pulse analyzer. Peaks are evident at energies of 32, 80, 163, 284, 364, 637, and 721 k. e. v. I have found that the iodine spectrum can be substantially reproduced by a source comprising barium and cesium in certain proportions and filtered by an absorber to reduce the intensity of the low energy rays relative to those of higher energies. A source of the character described hereinafter has been observed to produce the spectrum shown in curve B. It will be noted that each important peak of the iodine spectrum is reproduced by the mock iodine, at very nearly the same energy and the same height. Curve B resulted from a source wherein the ratio of barium disintegrations to cesium disintegrations was 5.7/1 and a cadmium filter 1.8 millimeters thick surrounded the source.

The filter should preferably entirely surround the mixture to approach broad-beam conditions of absorption. The filter material should be one having a K-absorption edge just below 85 k. e. v., so that its absorption coefficient is relatively high for radiation of that energy, to attenuate the low-energy radiation from the source. Cadmium, tin and Babbitt metal meet this requirement and also are mechanically satisfactory. Filters of cadmium, tin and Babbitt metal, preferably 1.8 mm. thick, have proved suitable to remove substantially all the characteristic cesium and barium X-rays produced in the point sources.

To produce a satisfactory source, barium-133 may be obtained as barium nitrate and cesium-137 as cesium chloride, both compounds also having stable carrier material present. The parent short-lived isomer of the barium should be allowed to decay until its radiation is negligible compared to that of the barium-133. Samples of barium-133, cesium-137, and iodine-131 are compared with standard samples in a high pressure ion chamber to find their "absolute strengths" in millicuries, based upon the known decay scheme of cesium and a postulated decay scheme for barium. As is customary in radioisotope work, the amounts of materials are expressed in terms of their intensities in curies or millicuries, and the composition of the sources herein described is given in terms of the ratio of millicuries of barium to millicuries of cesium. Then the barium and cesium compounds are weighed, and selected amounts of each sample are mixed together to obtain the desired ratio.

Figure 5:
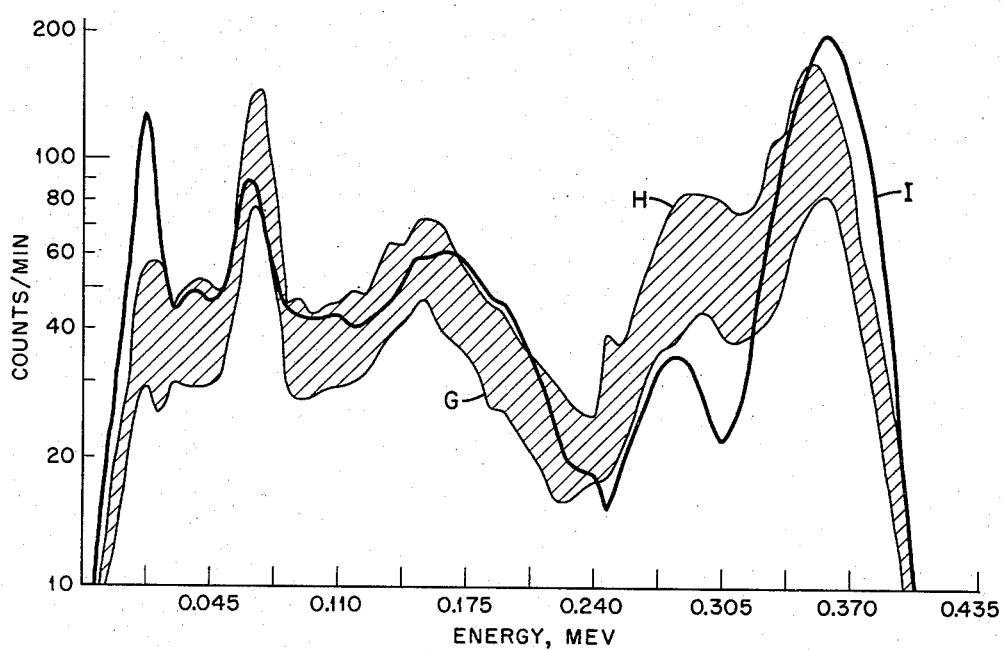
Figure 5 illustrates the changes in the spectra of mock-iodine-270 between the preferred upper and lower barium-cesium ratios.

I have found that a barium/cesium ratio of 11.0 produced even closer equivalence between the spectra of mock-iodine and real iodine-131 than did the ratio of 5.7, used in constructing the source whose spectrum is shown in curve B. Referring now to Figure 5, I have determined that barium/cesium ratios between 9/1 to 11/1 give the best spectrum, when filtered through 0.7 to 0.9 millimeter of tin. Measurements made under varying experimental conditions in air and water, and at varying distances from the source, indicate that the barium/cesium ratio may vary rather widely without causing much change in the observed ratios of the strengths of the spectra. Allowing for ten percent error in counting, ratios ranging from 5.7/1 to 14/1 give satisfactorily close simulation, although values of 9/1 to 11/1 are preferred for one percent accuracy. Examples of the modification of the mock-iodine spectrum with changes in the ratio are shown in curves G, H, while curve I shows the iodine-131 spectrum. Curve G represents a barium-cesium ratio of 5.7/1 while curve H represents a ratio of 14/1. It has been determined and may be seen from Figure 5 that ratios between these two limits give satisfactory simulation of the iodine spectrum. For ratios above about 14/1, it will be noted that the 80 k. e. v., 163 k. e. v., and 284 k. e. v. peaks are much too high to be corrected by a filter, while for ratios below about 5.7/1 the 661 k. e. v. peak (Fig. 1) becomes too high, while the 364 k. e. v. and 163 k. e. v. peaks become much too low. Within the preferred range, the reduction in counts of certain energies is counterbalanced by the increase in counts at other energies so that the total counting rate is not in error by an amount greater than the normal permissible error in counting; i. e., about 10 percent. From consideration of the iodine spectrum and the response of counting equipment to the gamma radiation emitted by iodine, it has been determined that for optimum simulation, ratios should be chosen such that, for the integral curves of Fig. 3

$$\frac{\text{Ave. ordinate curve F (20-180 k. e. v.)}}{\text{Ave. ordinate curve F (500-600 k. e. v.)}} = \frac{\text{ave. ordinate curve E (20-180 k. e. v.)}}{\text{ave. ordinate curve E (470-570 k. e. v.)}}$$

The above Ba/Cs ratios produce spectra which satisfy the stated relation within permissible error limits, with ratios of 9/1-11/1 providing optimum simulation.

While iodine-131 localizes principally in the thyroid, it also is distributed, in dilute form, to other parts of the body. Therefore a suitable mock-iodine gamma source should be capable of distribution in a uniform manner through large and small volume extended sources of variable shapes, in addition to being suitable for a point source. I provide for simulation of the distribution of the radioactive material in human tissue by dispersing barium-133 and cesium-137 an ion exchange resin, as mentioned above, and surrounding the material by a suitable shield or filter.

To form the source, the resin as commercially obtained is first dried out to remove most of the moisture, then placed in two separate gravity columns. Barium and cesium in solution are added to the top of respective columns, where they are absorbed in the upper layer of resin. Both columns are dried by sucking air through them with an aspirator. The number of microcuries of each isotope per gram of resin in each column is then determined, and the two columns are mixed, with the activity being controlled by weighing the amount of resin. A small amount of carrier cesium may be added to increase the absorption of the resin, if desired. Alternatively, the cesium and barium may be mixed in solution and the solution put through a single ion exchange column. The barium will stick in the upper layer of the resin, while the cesium will go down a little lower, but no activity will come through the column.

The resin is then dried and mixed, to uniformly disperse the two isotopes.

One use of the mock iodine 270, as mentioned before, is in uptake measurements with a phantom. The phantom may be a plastic mannequin having a plastic outer shell to provide the desired filter. With this filtration, the sources used inside the phantom may be encased in aluminum or plastic, rather than metal, if desired. A weak mixture of radioactive resin may be used to fill the space within the phantom to provide a body background similar to that caused by iodine-131 circulating in the human body.

Figure 2:
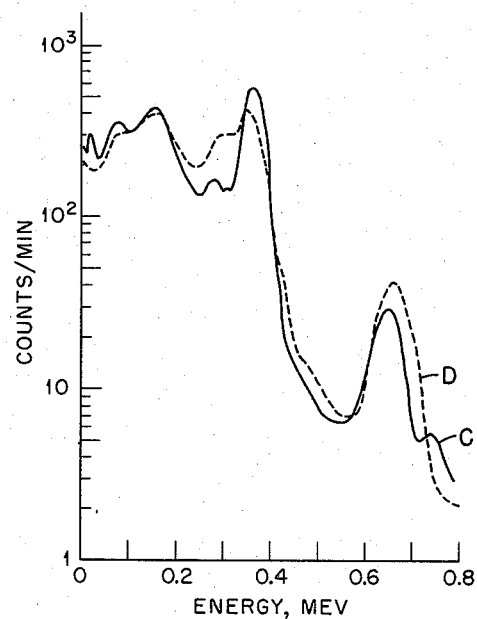
Figure 2 illustrates gamma ray spectra of iodine-131 in a phantom in curve C, and that of mock-iodine-270 in a phantom in curve D.

Figure 2 shows how closely the spectra of iodine-131 and mock-iodine-270 correspond when the two substances are dispersed in a phantom, curve C representing iodine-131 and curve D representing the mock-iodine.

Figure 3:
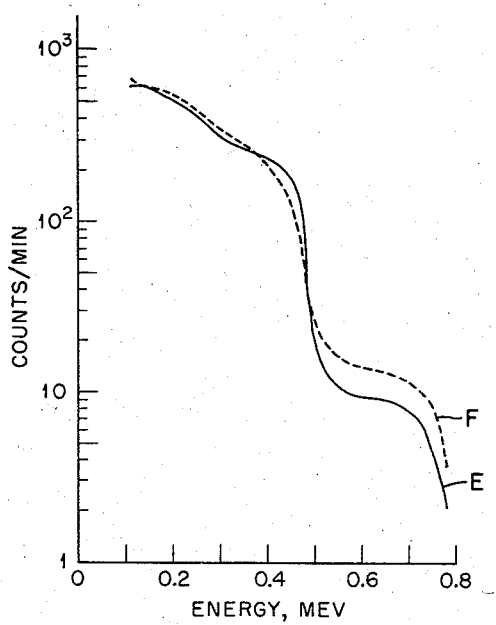
Figure 3 shows the integral spectra in a phantom of iodine-131 in curve E and mock-iodine-270 in curve F.

Figure 3 illustrates integral pulse-height curves, curve E representing an iodine-131 source in a phantom, and curve F representing a mock-iodine source in a similar phantom. The close simulation of the integral iodine spectrum by the mock-iodine source may be readily observed from the close correspondence of these curves.

Figure 4:
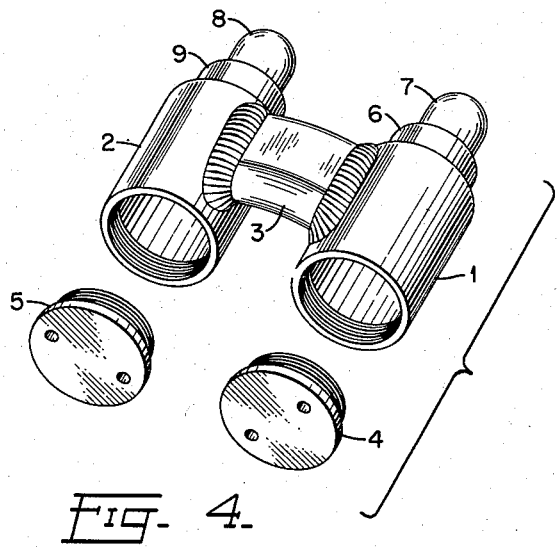
Figure 4 illustrates a typical mock-iodine source simulating the thyroid gland.

Referring now to Figure 4, my novel source may comprise barium and cesium sealed inside a container shaped to correspond to a bodily organ, such as the human thyroid. Hollow cylinders 1, 2 are joined together by hollow, curved bridge 3 and are provided at one end with threaded caps 4, 5. At the opposite ends, successively smaller hollow members 6–9 are provided to close those ends. The containers may be made from the filter materials mentioned above, or they may be plastic or aluminum, if they are then surrounded by the proper filter material, as by placing them in a phantom.

It will be apparent to those skilled in the art that I have provided a novel calibration radiation source simulating the gamma spectrum of iodine-131, but possessing much longer half life. The invention may take the form of a point source, for instrument calibration and for simulating some body organ which has selectively absorbed a radioisotope, or it may take the form of a dispersed source to simulate body background counts, as hereinbefore described.

Having described my invention, what is claimed as novel is:

1. A mock iodine-131 source which comprises a mixture of barium-133 and cesium-137 in a ratio of 5.7–14 curies of barium to 1 curie of cesium, encased in a filter of atomic number below approximately 51 and substantially 0.7–0.9 millimeters thick.

2. The source of claim 1, wherein the filter is selected from the group consisting of tin, cadmium, and Babbitt metal.

3. A mock iodine-131 source which comprises a mixture of barium-133 and cesium-137, wherein the barium and cesium are present in a barium-cesium ratio of approximately 9/1 to 11/1, encased in a tin filter 0.7 to 0.9 millimeters in thickness.

4. A mock iodine-131 source which comprises a mixture of barium-133 and cesium-137, wherein the barium and cesium are present in a barium-cesium ratio of approximately 5.7/1 to 14/1, uniformly dispersed in an ion exchange resin, and a filter surrounding said resin, said filter comprising a material of atomic number below approximately 51 and substantially 0.7–0.9 millimeters thick.

5. A mock iodine-131 source which comprises a mixture of barium-133 and cesium-137, wherein the barium and cesium are present in a barium-cesium ratio of approximately 10.7/1, uniformly dispersed in an ion exchange resin, and a container disposed about said mixture and said resin, said container being fabricated from a material of atomic number below substantially 51 and 0.7–0.9 millimeter thick, said container conforming substantially to the contour of the thyroid gland of the human body.

References Cited in the file of this patent

Some Recent Advances in Radiochemistry, by Emeleus, in Nature, vol. 163, April 23, 1949, pages 624–625.

A Possible Standard for Radioactive Iodine, by Aten, in Science 110, October 14, 1949, pages 394–5; abstract in Nuclear Science Abstracts, vol. 4, 1950 #893.

A Precise Determination of the Energy of Cs-137, by Langer et al., Physics Review, vol. 78, April 1950, pages 74–75.